United States Patent [19]

Ikeda et al.

[11] Patent Number: 5,770,088

[45] Date of Patent: Jun. 23, 1998

[54] SIMULATED MOVING BED CHROMATOGRAPHIC SEPARATION PROCESS

[75] Inventors: Hirokazu Ikeda, Ako; Masakazu Negawa, Himeji; Fumihiko Shoji, Arai, all of Japan

[73] Assignee: Daicel Chemical Industries, Ltd., Osaka-fu, Japan

[21] Appl. No.: 771,430

[22] Filed: Dec. 20, 1996

Related U.S. Application Data

[63] Continuation of Ser. No. 509,801, Aug. 1, 1995, abandoned, which is a continuation-in-part of Ser. No. 501,587, Jul. 12, 1995, abandoned, which is a continuation of Ser. No. 85,444, Jun. 30, 1993, Pat. No. 5,456,825, and a continuation of Ser. No. 261,328, Jun. 16, 1994, abandoned.

[30] Foreign Application Priority Data

Jun. 30, 1992 [JP] Japan .................................. 4-172123
Jun. 30, 1992 [JP] Japan .................................. 4-172124

[51] Int. Cl.⁶ .................................................. B01D 15/08
[52] U.S. Cl. ........................................ 210/659; 210/198.2
[58] Field of Search ................................... 210/635, 656, 210/659, 662, 198.2

[56] References Cited

U.S. PATENT DOCUMENTS

| | | | |
|---|---|---|---|
| 4,909,935 | 3/1990 | Bradshaw | 210/198.2 |
| 4,996,277 | 2/1991 | Bradshaw | 210/656 |
| 5,114,590 | 5/1992 | Hotier | 210/659 |
| 5,126,055 | 6/1992 | Tamashita | 210/659 |
| 5,196,575 | 3/1993 | Sebastian | 562/402 |
| 5,262,052 | 11/1993 | Rossiter | 210/635 |
| 5,268,442 | 12/1993 | Bradshaw | 528/25 |
| 5,422,007 | 6/1995 | Nicoud | 210/659 |
| 5,434,298 | 7/1995 | Negawa | 210/659 |
| 5,434,299 | 7/1995 | Negawa | 210/659 |
| 5,470,464 | 11/1995 | Priegnitz | 210/198.2 |
| 5,498,752 | 3/1996 | Negawa | 210/659 |

FOREIGN PATENT DOCUMENTS

WO9322022 11/1993 WIPO .................................. 210/198.2

Primary Examiner—Ernest G. Therkorn
Attorney, Agent, or Firm—Browdy and Neimark

[57] ABSTRACT

In the simulated moving bed chromatographic separation process, preferably using a simulated moving bed chromatographic separation apparatus with rotary valves and/or check valves, a supercritical fluid is used as an eluent and thereby efficiency in separation and operation is remarkably improved and the concentration step after the chromatographic separation is not required.

13 Claims, 2 Drawing Sheets

SIMULATED MOVING BED CHROMATOGRAPHIC SEPARATION PROCESS

This application is a continuation of application Ser. No. 08/509,801, filed Aug. 1, 1995, now abandoned, which is a continuation-in-part application of (1) application Ser. No. 08/501,587, filed Jul. 12, 1995, now abandoned, which is a continuation of application Ser. No. 08/085,444, filed Jun. 30, 1993, now issued as U.S. Pat. No. 5,456,825, and (2) application Ser. No. 08/261,328, filed Jun. 16, 1994, now abandoned.

FIELD OF THE INVENTION

This invention relates to a simulated moving bed chromatographic separation process. More particularly, the present invention relates to a new simulated moving bed chromatographic separation process in which the number of theoretical plates of a unit column is substantially increased and efficiency in separation and operation is excellent and the subsequent concentration operation is not required.

BACKGROUND OF THE INVENTION

Chromatographic separation process has been generally employed as measures for industrially isolating a specific ingredient from a stock solution containing a plurality of substances such as isomeric mixtures. The chromatographic separation process includes batch process and simulated moving bed process. In both cases, adsorbents such as ion-exchange resins, zeolite, silica gel, etc. are used and aqueous and organic solvents are used as eluents. In chromatographic separation, when a stock solution is passed together with an eluent through a column packed with an adsorbent, a specific ingredient and the other ingredient or ingredients contained in the stock solution are separated because of the difference in adsorbability thereof by the adsorbent and thus a solution containing the specific ingredient and another solution not containing said ingredient are obtained. The specific ingredient can be isolated by recovering the solution containing it and concentrating it.

However, the diffusion rate of eluents in the unit column is limited and, therefore, it is, difficult to increase the number of theoretical plates of a unit column in order to improve separation efficiency. Also the concentration of the object ingredient in the separated solution is low and, therefore, a concentration treatment is necessary and a storage equipment for the dilute solution is required. Concentration of a dilute solution is inefficient and disadvantageous from the industrial viewpoint. That is, a large scale equipment is required and a large scale plant unit is necessary for a large scale separation.

An example of the simulated moving bed separation system which can be used for the chromatographic separation process is the system described in JP-B-42-15681.

In the simulated moving bed separation system proposed in the above-mentioned patent, there are provided four work zones packed with a solid adsorbent and connected to each other in a line, with the outlet of the fourth work zone being connected to the inlet of the first work zone so that a fluid can circulate through these four work zones. Also, a port for feeding a multi-component feedstock mixture to be treated into said work zones, a port for drawing out a weakly adsorbable component (raffinate) from said work zones, a port for supplying an eluent into the work zones and a port for drawing out the eluent and a strongly adsorbable component (extract from the work zones are provided so that the positions of the ports will advance simultaneously at given time intervals.)

The solid adsorbent packed in said work zones is a fine powder with a particle size of usually 15 mm or greater (see page 11, right column lines 6–10 of JP-B42-15681). Solid adsorbents with such a large particle size enable high-rate introduction of a feedstock mixture and an eluent. However, in order to accomplish separation at an even higher efficiency and higher rate by using the above simulated moving bed separation system, it is necessary to make smaller the particle size of the solid adsorbent. This, however, involves the difficult problems. When a solid adsorbent with a smaller particle size than those used hitherto is packed in the work zones and a feedstock mixture and an eluent are introduced into these work zones at high speed as in the prior art, there tends to occur a pressure loss in the work zones and back flow of the circulating fluid takes place in the work zones. Back flow of the circulating fluid causes a serious reduction of separating efficiency. Thus, when it is tried to improve the separating efficiency by reducing the particle size of the solid adsorbent, it is necessitated to drop the feed rate of the feedstock fluid into the work zones, and such drop of the feed rate decreases the separating efficiency to an intolerable level for industrial practice.

Also, in case the packing used in the simulated moving bed is already small in particle size, when the feedstock fluid charging rate is increased for further improving the separating efficiency, there takes place back flow of the circulating fluid as mentioned above to lower the separating efficiency.

Actually, many attempts have been made in recent years for separating optical isomers by using a simulated moving bed system of the described type. In these operations, and an optical resolving agent with a very small particle size, which is in the order of one to several ten microns, is packed in the beds, and a feeding mixture and an eluent are introduced at high rates in between the adjoining unit packed beds. In this case, the pressure loss by the packing is very great and the pressure at the outlet of a unit packed bed would become lower than the pressure of the eluent or feedstock fluid, causing such eluent or feedstock fluid to flow in the direction opposite to the flow of the circulating fluid.

The conventional simulated moving bed separation system, when described in other terms, comprises a plurality of unit packed beds connected in series to each other, in which a solution containing a feedstock mixture and an eluent are introduced into the packed bed containing an optical resolution packing therein and having front and rear ends thereof connected to each other endlessly via a fluid passage to circulate a fluid unidirectionally while at the same time drawing out a solution containing a separated component and a solution containing another component from the packed bed, wherein a port for introducing an eluent, a port for drawing out a solution containing a strongly adsorbable substance (extract), a port for introducing a solution containing a feedstock mixture, and a port for drawing out a solution containing a weakly adsorbable substance (raffinate) are arranged in the packed bad in this order along the direction of fluid flow and the positions of these ports are successively moved in the direction of fluid flow in the packed bed intermittently.

Also, in the conventional simulated moving bed separation system, in order to successively move said introducing and draw-out ports intermittently, there are provided four rotary valves, one for introducing a solution containing a feedstock mixture, one for introducing an eluent, one for drawing out an extract and one for drawing out a raffinate.

Further, a circulation pump is disposed between a specific unit packed bed and another unit packed bed positioned downstream of said specific unit packed bed for circulating a fluid when moving said introducing and draw-out ports successively by switching said four rotary valves.

In operation of the simulated moving bed separation system, when the positions of said eluent introducing port, feedstock fluid introducing port, extract draw-out port and raffinate draw-out port are shifted by change-over operations of said rotary valves through a distance corresponding to one unit packed bed, the works to be performed in the respective unit packed beds, namely adsorption, concentration, desorbing and recovering of the eluent, are switched correspondingly. In each of said working steps, there is a set flow rate which has been determined for accomplishing the desired separation.

Therefore, as the works to be performed in the respective unit packed beds are shifted by the rotary valve change-over operation, the flow rate of the circulation pump must be changed in accordance with the work to be performed.

It is essential that there is no difference between the circulation flow rate in the line preceding the circulation pump and the flow rate in the line succeeding said pump and between the feed rate into the circulation pump and the discharge rate from said pump. Therefore, the flow rate of the circulation pump must be adjusted stepwise synchronously with all of the other rotary valves upon every change-over operation of a rotary valve.

Thus, when the circulation pump was set between a specific unit packed bed and the adjoining unit packed bed on the downstream side, it was necessary to perform the troublesome operation of stepwise increasing or decreasing the fluid flow rate in the circulation pump upon every shifting of said introducing and draw-out ports in the direction of fluid flow.

The present invention has been made in view of the above circumstances.

The present invention is to provide an improved simulated moving bed chromatographic separation process, which offsets the above described disadvantages with increased number of the theoretical plates of a unit column, is excellent in separation and operation efficiency and requires no subsequent concentration operation.

Other objects will be understood from the following description.

After intensive study on simulated moving bed chromatographic separation process in order to solve the above-described problems, we have found that if a supercritical fluid is employed in the simulated moving bed chromatographic separation of a specific object substance from a stock material containing a plurality of substances, the number of theoretical plates of a unit column is improved thus separation can be more efficiently effected, and can eliminate the concentration operation.

SUMMARY OF THE INVENTION

This invention relates to a simulated moving bed chromatographic process for separating a mixture of substances comprising: forming a circulation circuit comprising a plurality of columns each provided with an inlet port and an output port and packed with a solid adsorbent, said columns being serially and endlessly connected so as to achieve serial and unidirectional fluid flow through said columns, and means for pumping a fluid through said columns; introducing a stock solution containing a plurality of substances to be separated into one of the columns via the inlet port thereof in order to make strongly adsorbable substances adsorbed on the adsorbent in the column and several columns that follow; drawing out a solution rich in the other substances being weakly adsorbable on the adsorbent via the outlet port of another one of the columns; introducing a supercritical fluid as an eluent into still another one of the columns via the inlet port thereof; drawing out a solution rich in the strongly adsorbable substances via the outlet port of further another one of the columns; and passing the remaining solution and the supercritical fluid through the circuit and recirculating them, wherein the position for introducing the supercritical fluid, the position for drawing out the solution containing the strongly adsorbable substances, the position for introducing the stock solution and the position for drawing out the solution containing the weakly adsorbable substances are arranged in the circulation in this order along the direction of the fluid flow, and the positions are successively moved in the direction of the fluid flow in the circuit intermittently.

Further, the present invention is involved in a process, said circuit further comprising a first rotary valve, a second rotary valve, a third rotary valve, a fourth rotary valve a fifth rotary valve; the first rotary valve having an inlet and a plurality of outlets, with each of the outlets being connected to the inlet port of each of the columns, whereby the first rotary valve is coupled to each of the columns, the first rotary valve being designed to supply the stock solution to the column whose inlet port is assigned to the position for introducing the stock solution; the second rotary valve having an outlet and a plurality of inlets, with each of the inlets being connected to the outlet port of each of the columns, whereby the second rotary valve is coupled to each of the columns, the second rotary valve being designed to draw out the solution containing the weakly adsorbable substances from the column whose outlet port is assigned to the position for drawing out the solution containing the weakly adsorbable substances; the third rotary valve having an outlet and a plurality of inlets, with each of the inlets being connected to the outlet port of each of the columns, whereby the third rotary valve is coupled to each of the columns, the third rotary valve being designed to draw out a fluid from the output port of the column positioned downstream of the column from which the weakly adsorbable substances have been drawn out, for forced circulation; the fourth rotary valve having an inlet and a plurality of outlets, with each of the outlets being connected to the inlet port of each of the columns, whereby the fourth rotary valve is coupled to each of the columns, the fourth rotary valve being designed to supply the fluid discharged from the outlet of the third rotary valve and the supercritical fluid to the column whose inlet port is assigned to the position for introducing the supercritical fluid; said means for pumping the fluid disposed between said outlet of said third rotary valve and said inlet of said fourth rotary valve, said means being designed to transfer the fluid discharged out from said outlet of said third rotary valve to said inlet of said fourth rotary valve; the fifth rotary valve having an outlet and a plurality of inlets, with each of the inlets being connected to the outlet port of each of the columns, whereby the fifth rotary valve is coupled to each of the columns, the fifth rotary valve being designed to draw out the solution containing the strongly adsorbable substances from the column which outlet port is assigned to the position for drawing out the solution containing the strongly adsorbable substances; wherein the position for introducing the supercritical fluid, the position for drawing out the solution containing the strongly adsorbable substances, the position for introducing the stock solution and the position for drawing out the solution containing the weakly adsorbable substances are shifted by the change-over operation of said first to fifth rotary valves, and the discharge rate of said circulation pump is constant during change-over of said third rotary valve.

Furthermore, the present invention is concerned with a process, said circuit further comprising a check valve which is provided in the circuit between the column and each of the position for introducing the supercritical fluid, the position for drawing out the solution containing the strongly adsorbable substances, the position for introducing the stock solution and the position for drawing out the solution containing the weakly adsorbable substances, preceding the next column in the direction of the fluid flow, whereby said check valve prevents fluid passage in the direction opposite the direction of the fluid flow.

In addition, the present invention relates to a process, wherein the solid adsorbent is a filler for optical resolution.

Further, the present invention is concerned with a process, wherein the solid adsorbent is selected from the group consisting of particles of a cellulose ester derivative, particle of a cellulose carbamate derivative and those substances carried on a support.

Furthermore, the present invention is involved in a process, wherein the mixture of substances to be separated is a mixture of optical isomers, a mixture of diasteromers, or a mixture of structural isomers.

In addition, the present invention relates to a process, wherein each one-fourth of the total columns is allotted to an adsorption step, a purification step, the desorption step and an eluent recovery step.

The total number of the columns is theoretically at least four. Therefore, the term "several" includes zero but usually 8 or more columns are used. Usually an even number of columns are used and an equal number of columns are allotted to each step.

DESCRIPTION OF THE PREFERRED EMBODIMENTS

In the following embodiment of the process of the present invention, from a fluid (A), which contains a plurality of substances to be separated, an object substance is isolated by means of a simulated moving bed (B).

(A) Stock Solution Containing a Plurality of Substances

Stock solutions to which the present invention is applicable are not specifically limited. Examples thereof are solutions containing compounds used in the domains of medicinals, pesticides, food stuff, livestock feed, perfumes, etc. such as thalidomide, chloroquin, etc., which are medicinals; EPN, which is an organic phosphorus pesticide; monosodium salt of glutamic acid which is a seasoning material, menthol, which is used in perfumery.

Also mixtures of optical isomers of optically active alcohols, esters, amines, amides, carboxylic acids, etc. are included. Examples thereof are mixtures of diastereomers such as optically active tartaric acid esters of amino acids, optically active camphorsulfonic acid esters of amines, etc.; mixtures of structural isomers such as cis-trans position isomers, etc.

Further, the process of the present invention is applicable to separation of a mixture of normal hexane and cyclohexane; a mixture of compounds which have boiling points close to each other, such as hydrocarbons, alcohols, aldehydes and ketones; an aqueous solution containing glucose and fructose; a mixture of maltose and polysaccharides larger than maltotriose; a mixture of isomerized sugars including oligosaccharides; a mixture of fatty acids and triglycerides, etc.

Also drugs described in the 1980 edition of "US Pharmaceutical Dictionary of Drug Names" and pesticides described in "The Pesticide Manuals" (1979), are included in the substances to which the process of the present invention is applicable.

Among the above-mentioned, solutions containing mixtures of optical isomers, a mixture of diastereomers, a mixture of structural isomers, etc. can be referred to as the materials to which the process of the present invention is most suitable to apply.

(B) Apparatus for Simulated Moving Bed Chromatography

The simulated moving bed chromatographic apparatus employed in the process of the present invention comprises a circulation circuit consisting of a plurality of columns packed with a solid adsorbent and an inlet port and an outlet port. In the circuit, there are set up a first inlet, through which a supercritical fluid is introduced; a first outlet, through which a fluid which is rich in the strongly adsorbed substances (called extract) is taken out; a second inlet, through which a stock solution containing a plurality of substances is introduced together with a supercritical fluid; and a second outlet, through which the solution rich in weakly adsorbed substances (called raffinate) is taken out, in the direction of the fluid flow in this order in every several columns. The apparatus is further provided with valve means which is able to shift the position of the first and second inlet and the first and second outlet column by column at a predetermined interval. In operation, the stock solution and the supercritical fluid are introduced into the circuit through the second inlet port and the raffinate and extract are taken out through the first and second outlet. An additional amount of the supercritical fluid as an eluent is supplied into the circuit via the first inlet.

Figure 1:
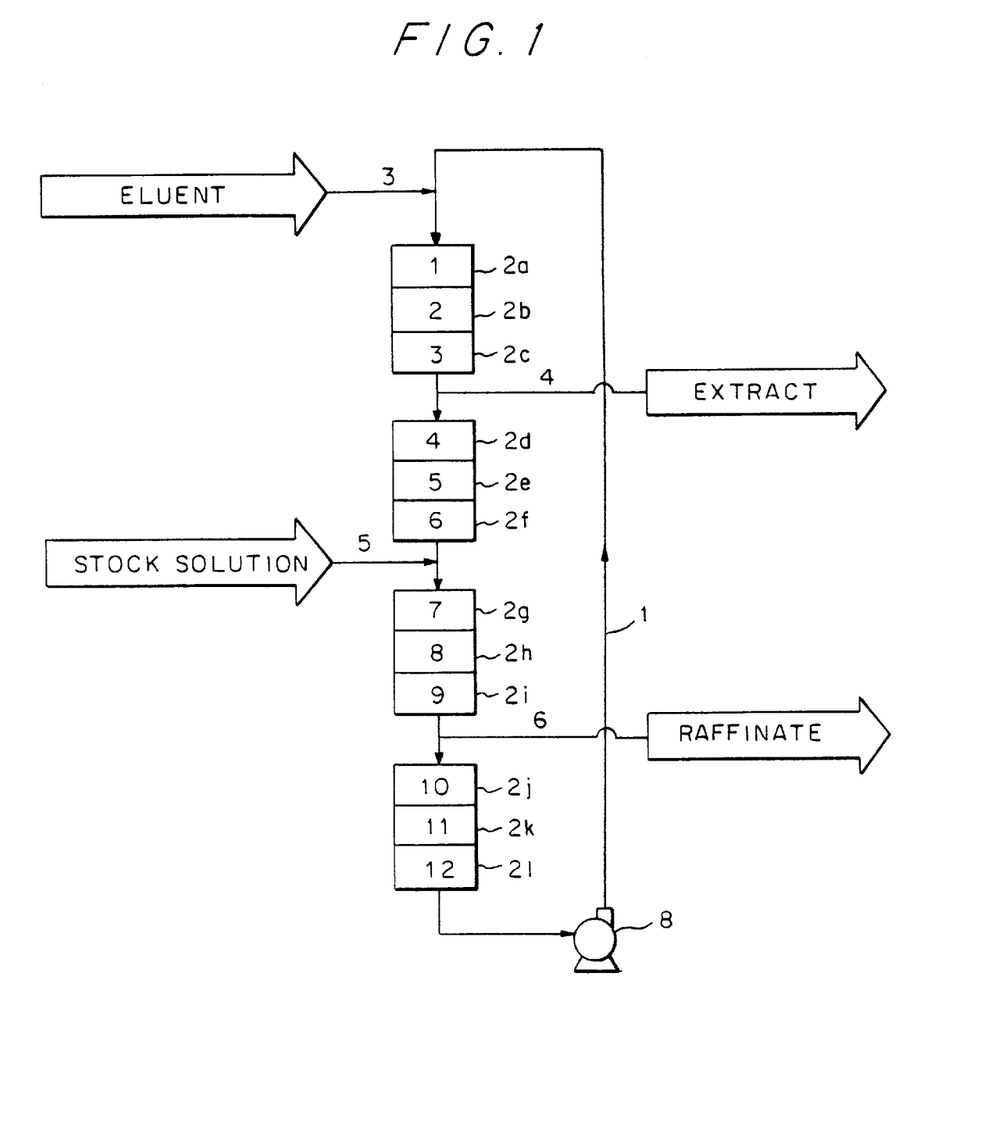
FIG. 1 is a simplified schematic presentation of an embodiment of the simulated moving bed chromatographic separation process of the present invention using twelve unit columns.

The simulated moving bed, as illustrated in FIG. 1, comprises a packed bed assembly consisting of a plural number (for example, 12 or 8) of unit packed beds 2a–21 arranged in series to each other in a fluid passage 1 through which a fluid is circulated. In the fluid passage, a fluid is circulated in one direction. The number of the unit packed beds used in the system is not defined; it may be properly selected in consideration of the scale of practice, adsorption technique and other matters.

In this packed bed system, as shown in FIG. 1, a port 3 for introducing a supercritical fluid as an eluent, a port 4 for drawing out a solution containing a substance strongly adsorbable on the packing, i.e. an extract, a port 5 for introducing a feedstock fluid and a port 6 for drawing out a solution containing a substance weakly adsorbable on the packing, i.e. a raffinate, are arranged in this order and designed so that the positions of these ports can be successively changed in the direction of fluid flow in the packed bed intermittently.

In the simulated moving bed separation system shown in FIG. 1, the supercritical fluid introducing port 3 is connected to a section of the fluid passage 1 communicating the 12th unit packed bed 21 and the first unit packed bed 2a, the extract draw-out port 4 is connected to a section of the fluid passage 1 communicating the third unit packed bed 2c and the fourth unit packed bed 2d, the feedstock fluid introducing port 5 is connected to a section of the fluid passage 1 communicating the sixth unit packed bed 2f and the seventh unit packed bed 2g, and the raffinate draw-out port 6 is connected to a section of the fluid passage 1 communicating the ninth unit packed bed 2i and the tenth unit packed bed 2j. For successively moving these introducing and draw-out ports along the direction of fluid flow intermittently, there are used, for example, rotary valves. Also, a recycle pump 8 or like means is employed for circulating a fluid through the fluid passage 1 in this simulated moving bed separation system.

The internal pressure of the circulation circuit is kept at a pressure which maintains the eluent fluid at a supercritical state. Practically it is not lower than 60 atm., and preferably not lower than 70 atm. The temperature of the circuit is usually not lower than 30° C. and preferably not lower than 40° C.

If the pressure is lower than the above-mentioned, the eluent fluid cannot be maintained in the liquid state and thus it is circulated in the gaseous state, which invites drop in the separation efficiency. The temperature range lower than the above-mentioned lowers the separation efficiency as well.

Supercritical Fluid

The term "supercritical fluid" means a fluid which can exist as a liquid at a temperature over the critical temperature and a pressure over the critical pressure. Specific examples of usable substances, which can be in this state, are carbon dioxide, nitrous oxide, ammonia, sulfur dioxide, hydrogen halides, hydrogen sulfide, methane, ethane, propane, ethylene, propylene, halogenated hydrocarbon, etc.

Among these carbon dioxide is most preferable when explosiveness, toxicity to human being, etc. are considered. When this gas is employed as a supercritical fluid, it is used at a pressure of not lower than 31.3° C. and at a pressure of not lower than 79.9 atm., which are the critical conditions of this gas.

A small amount of a solvent can be mixed with said supercritical fluid.

Examples of the usable solvents are alcohols such as ethanol, methanol, 2-propanol, etc.; organic acids such as acetic acid, propionic acid, etc.; amines such as diethyl amine, monoethanolamine, triethylamine, etc.; aldehydes such as acetaldhyde, etc.; ethers such as tetrahydrofuran, ethylether, etc.

Solid Adsorbent

The usable solid adsorbents are also not limited insofar as they adsorb a specific ingredient in the stock solution. Examples of the usable adsorbents are silica gel, ion exchange resins, zeolite; silica gel, those whose surface is chemically modified or coated with a polymer, etc. An example of the surface-modified silica is ODS.

In the present invention, a filler (adsorbent) for separation of optical isomers can be suitably used, As fillers for optical resolution, silica gel, on which an optically active compound, a low molecular compound having optical resolution ability, a protein or a derivative thereof is carried, or a solid adsorbent comprising any of the above-mentioned compounds per se in the particulate form without any carrier can be used.

Examples of the above optically active substances are polysaccharide ester derivatives, polysaccharide carbamate derivatives, polyacrylate derivatives, polyamide derivatives, etc.

The polysaccharides of the above-mentioned polysaccharide ester derivatives and polysaccharide carbamate derivatives are not specifically limited insofar as they are optically active. Examples thereof are naturally occurring polysaccharides, modified natural polysaccharides, synthesized polysaccharides, oligo sugars, etc.

Specific examples of the above-mentioned polysaccharides are χ1,4-glucan (amylose, aminopectin), β-1,4-glucan (cellulose), χ-1,6-glucan (dextran), β1,3-glucan (curdlan, disofilan, etc.), χ-1,3-glucan, β1,2-glucan (Crawn Gall polysaccharide), χ-1,6-mannan β1,4-mannan, β-1,2-fructan (inulin), β2,6-fructan (levan), β-1,4-xylan, β-1,3-xylan, β-1,4-chitosan, β-1,4-N-acetylchitosan (chitin), pullulan, agalose, arginic acid, etc.

Among these, cellulose, amylose, β-1,4-xylan, β-1,4-chitosan, chitin, etc. are most preferred.

The upper limit of the number-average degree of polymerization (an average number of pyranose or flanose contained in one molecule) of these polysaccharides is not more than 2,000 and preferably not more than 500 in view of easiness of handling.

Examples of the above-mentioned oligo sugars are maltose, malt-tetraose, maltpentaose, malthexaose, maltheptaose, isomaltose, eluose, paratinose, maltitol, maltorisotol, malt-tetraisotol, isomaltitol, χ-cyclodextrin, β-cyclodextrin, γ-cyclodextrin, etc.

The above-mentioned polysaccharide ester derivatives and polysaccharide carbamate derivatrives are the polysaccharide compounds, in which at least one of the hydrogen atoms of their hydroxyl or amino groups is substituted with one of the groups represented by the following chemical formulas.

(1)

(2)

(3)

(4)

wherein R stands for an ordinary or heterocyclic aromatic hydrocarbyl group unsubstituted or substituted with an alkyl group or groups having 1–12 carbon atoms, an alkoxy group or groups having 1–12 carbon atoms, an alkylthio group or groups having 1–12 carbon atoms, a cyano group or groups, a halogen atom or atoms, an acyl group or groups having 1–8 carbon atoms, an acyloxy group or groups having 1–8 carbon atoms, a hydroxyl group or groups, an alkoxycarbonyl group or groups having 1–12 carbon atoms, a nitro group or groups, an amino group or groups, and a dialkylamino group or groups having 1–8 carbon atoms.

Examples of the above aromatic hydrocarbyl groups are phenyl, naphthyl, phenantholyl, anthranyl, indenyl, indanyl, furyl, thionyl, pyryl, benzofuryl, benzothionyl, indyl, pyridyl, pyrimidyl, quinolyl, isoquinolyl, etc. Among these, phenyl, naphthyl and pyridyl are most preferred.

X stands for a divalent hydrocarbyl group having 1–4 carbon atoms, which may contain a double bond or bonds and a triple bond. Examples of X are methylene, ethylene, ethylydene, ethenylene, 1,2- or 1,3-propylene, 1,1- or 2,2-propylidyne, etc.

The degree of substitution with the above groups (1)–(4) is not less than 30%, preferably not less than 50% and more preferably not less than 80%.

The above-described polysaccharides which may have substituents can be prepared by reacting an acid chloride or an isocyanate with the hydroxyl or amino groups of the polysaccharides.

Examples of the above-described low molecular compounds having optical resolution ability are crown ether and derivative thereof, cyclodextrins and derivatives thereof.

Examples of the above-described proteins and derivatives thereof are various kinds of antibody proteins, $\chi_1$-acidic sugar proteins, various kinds of serum albunins, egg-white protein, and derivatives of these, etc.

In the process of the present invention, particles of the above-described optically active compounds, low molecular compounds having optical resolution ability, proteins or derivatives thereof can be used as a filler for separation of optical isomers. In this case, size of the particles of said optically active compounds, low molecular compounds having optical resolution ability, proteins or derivatives thereof is usually 1 $\mu$m–1 mm and preferably 5 $\mu$m–300 $\mu$m, although it depends on the sizes of the columns used and on the separation system.

The particle of said optically active compounds, low molecular compounds having optical resolution ability, proteins or derivatives thereof may be non-porous but preferably should be porous, When they are porous, the pore diameter is 10 Å–100 $\mu$m and preferably 10 Å–5,000 Å.

In the process of the present invention, said optically active compounds, low molecular compounds having optical resolution ability, proteins or derivatives thereof, which are carried on a suitable support, can be used.

Any organic and inorganic support can be used insofar as they can carry said optically active compounds, low molecular compounds having optical resolution ability, proteins or derivatives thereof.

Examples of the organic support are polystyrene, polyacrylamide, polyacrylate, etc.

Examples of the inorganic support are silica gel, alumina, magnesia, glass, kaolin, titanium oxide, silicate salts, diatomaceous earth, etc.

Of these, silica gel, alumina and silicate salts are most preferred.

These supports may be those which have been treated for modification of their surface properties.

The size of these supports is 1 $\mu$m–1 mm and preferably 5 $\mu$m–300 $\mu$m. The supports may be non-porous although to be porous is preferable. When porous supports are used, the pore diameter is 10 Å–100 $\mu$m, preferably 100 Å–5,000 Å.

The amount of said optically active compounds, low molecular compounds having optical resolution ability, proteins or derivatives thereof to be carried on a support is usually 1–100 wt %, preferably 5–50 wt % of the support. With an amount less than 1 wt %, optical resolution of a stock solution containing a plurality of substances cannot be effectively effected. With an amount in excess of 100 wt %, no technical effect corresponding to the amount is expected.

For the process of the present invention, solid adsorbents comprising particles of cellulose ester derivatives, cellulose carbamate derivatives or silica gel carrying these compounds are preferred.

Specifically, "CHIRALCEL OA"®, "CHIRALCEL OB"®, "CHIRALCEL OC"®, "CHIRALCEL OD"®, "CHIRALCEL OJ"®, "CHIRALCEL OG"®, "CHIRALCEL OF"®, "CHIRALPAK AS"®, "CHIRALPAK AD"®, "CROWNPAK CR (+)"®, "CHIRALCEL CA-1"®, "CHIRALCEL OK"®, "CHIRALPAK WH"®, "CHIRALPAK WM"®, "CHIRALPAK WE"®, "CHIRALPAK TO (+)"®, "CHIRALPAK OP (+)"®, etc, (all registered trademarks of Daicel Chemical Industries, Ltd.) marketed by said company.

The average particle size of the solid adsorbent varies depending on species of the components to be separated, volume velocity of the fluid which flows through the simulated moving bed, etc., but it is usually 1–100 $\mu$m, preferably 5–100 $\mu$m. However, it is desirable to use an adsorbent having an average particle diameter of 20–100 $\mu$m in order to keep the pressure loss small in the simulated moving bed. In these particle size range, the pressure loss in the simulated moving bed is small and the pressure loss will be kept at no more than 10 kgf/cm$^2$. On the other hand, the larger the particle size, the smaller the number of the theoretical plates of the bed. Therefore, if only the achievement of the practical number of theoretical plates for adsorption is considered, the average particle size of said solid adsorbent should be 20–50 $\mu$m.

Separation by the Simulated Moving Bed Chromatography

In the process of the present invention, separation of a stock solution containing a plurality of ingredients by the simulated moving bed chromatography is continuously carried out by circulating the solution through an adsorption step (1), a purification step (2), a desorption step (3) and an eluent recovery step (4).

(1) Adsorption Step

A stock solution containing a plurality of ingredients is contacted with a solid adsorbent so that the strongly adsorbable ingredient is adsorbed on the adsorbent while other weakly adsorbable ingredients are recovered as raffinate together with the supercritical fluid used.

(2) Purification Step The solid adsorbent which has adsorbed the strongly adsorbable ingredient is contacted with part of the recirculated extract, which is described below, so that the weakly adsorbable ingredient remaining in the bed is removed from the adsorbent.

(3) Desorption Step

The solid adsorbent, which has adsorbed the strongly adsorbable ingredient, is contacted with the supercritical fluid as an eluent so that the strongly adsorbable component fluid is desorbed from the adsorbent and taken out of the simulated moving bed as an extract together with the supercritical fluid.

(4) Eluent Recovery Step

The adsorbent, which retains substantially only the supercritical fluid, is contacted with a part of the raffinate and a part of the supercritical fluid in the adsorbent is recovered.

The steps (1) to (4) will be explained in detail with reference to FIG. 2 which shows a preferred apparatus used for this process.

Figure 2:
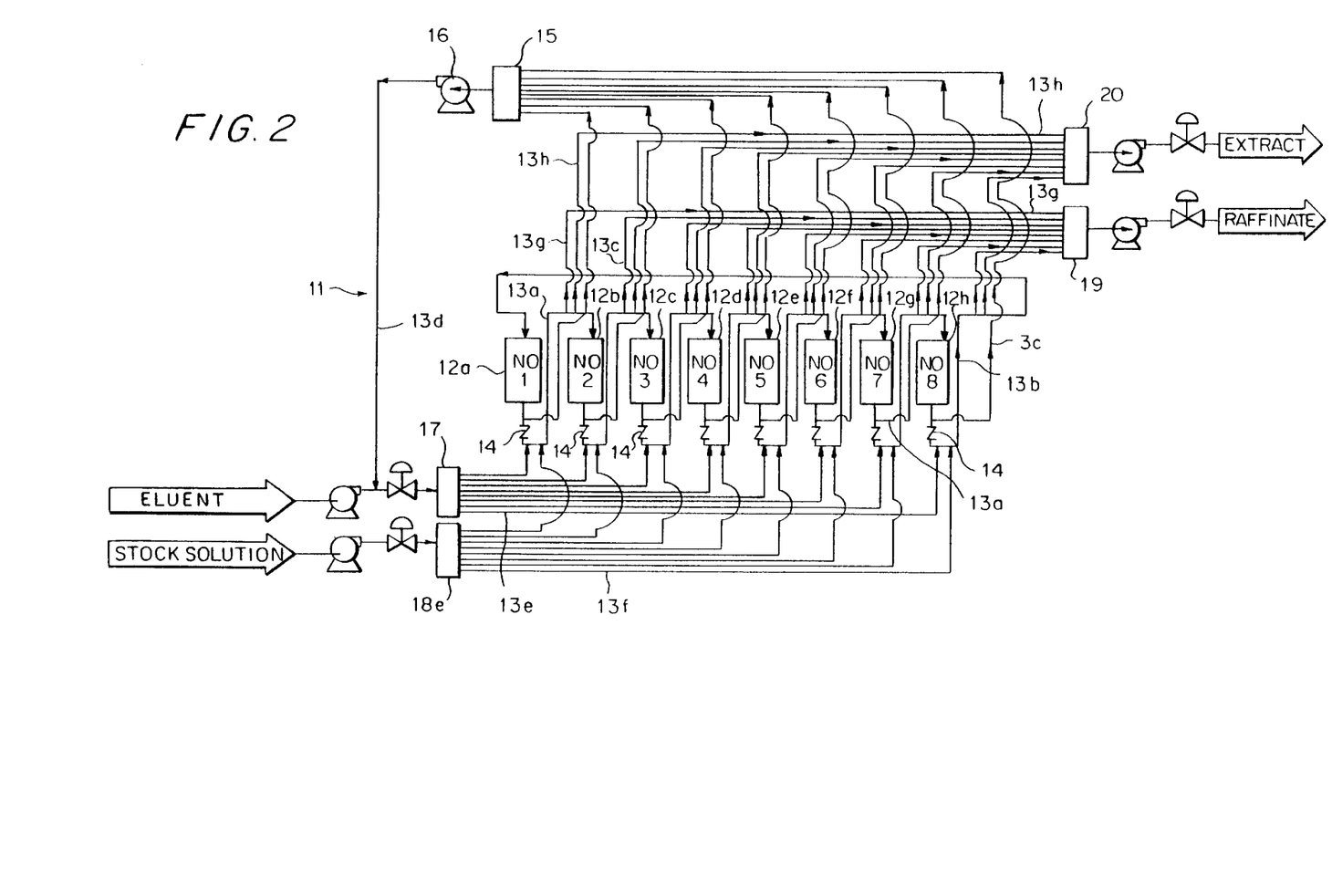
FIG. 2 is a schematic presentation of a preferred apparatus used for the simulated moving bed chromatographic separation process of the present invention.

As shown in FIG. 2, the simulated moving bed separation system 11 comprises the first to eighth unit columns 12a–12h. These unit columns are connected to each other by a fluid passage 13a. The eighth column 12h and the first column 12a are connected by a fluid passage 13a. A check valve 14 is provided in the fluid passage 13a connecting one column to the next column. This check valve 14 allows passage of a fluid from one column to the next but checks its backward flow.

A fluid passage 13c connected to a third rotary valve 15 branches from a section of the fluid passage 13a between a column and the associated check valve 14. In other words, a fluid passage 13c branching from the fluid passage 13a communicating the first and second columns 12a and 12b, a fluid passage 13c branching from the respective fluid passages 13a communicating the corresponding columns are connected to the third rotary valve 15. This third rotary valve 15 functions to select one fluid passage from the total 8 branching fluid passages 13c and draw out the fluid from the selected fluid passage 13c while leaving the other fluid passages 13c closed.

A circulation pump 16 is connected to the discharge side of said third rotary valve 15. The discharge side of said circulation pump 16 is connected to a fourth rotary valve 17 via a fluid passage 13d.

A supercritical fluid is supplied along with the fluid from said circulation pump 16 to the fourth rotary valve 17. Eight fluid passages 13e extend from the discharge side of said fourth rotary valve 17, each of said fluid passages 13e being connected to a section of the fluid passage 13e between the associated check valve 14 and the next column.

A stock solution is supplied to a first rotary valve 18 via a pump. Eight fluid passages 13f connect to the discharge side of said first rotary valve 18, each of said fluid passages 13f being connected to a section of the corresponding fluid passage 13a between the associated check valve 14 and the next column.

Also, a fluid passage 13g connected to a second rotary valve 19 branches from a section of the corresponding fluid passage 13a between the associated check valve 14 and the next column. Total 8 fluid passages 13g branching from the respective fluid passages 13a connect to said second rotary valve 19 which functions to open one of said branched fluid passages 13g while keeping the rest of them closed. A fluid is discharged out from this second rotary valve 19 by a pump.

Further, a fluid passage 13h connecting to a fifth rotary valve 20 branches from a section of the corresponding fluid passage 13a between the associated check valve 14 and the next column. Total 8 fluid passages 13h branching from the respective fluid passages 13a are connected to said fifth rotary valve 20 which functions to open one of said fluid passages 13h while keeping the rest of the closed.

In the simulated moving bed separation system 11 shown in FIG. 2, the first to fifth rotary valves 15–20 are set to function as described below.

The fourth rotary valve 17 functions to select one fluid passage 13e so that the corresponding fluid passage 13b communicating the eighth column 12h with the first column 12a while the other fluid passages 13a are left closed. The fifth rotary valve 20 operates to select a fluid passage 13h so that only the fluid passage 13h branching from the fluid passage 13a communicating the first and second columns is brought into an open state while leaving the other fluid passages 13h in a closed state. In the case of the first rotary valve 18, one fluid passage 13f is selected so that only the fluid passage 13f connected to the fluid passage 13a communicating the third and fourth unit packed beds 12c and 12d is opened while the other fluid passages 13f are left closed. The second rotary value 19 functions to select one fluid passage 13g so that only the fluid passage 13g branching from the fluid passage 13a communicating the seventh and eighth columns 12g and 12h is opened while the other fluid passages 13g are kept closed, and the third rotary valve 15 functions to select one fluid passage 13c so that only the fluid passage 13c between the eighth column 12h and the associated check valve 14 is opened while the other fluid passages 13c are left closed.

Said first to fifth rotary valves 15, 17–20 are synchronized in operation by a control device not shown in the drawing. A computer programmed to effect synchronous operation of the first to fifth rotary valves or a similarly programmed relay system sequencer may be used as the control device.

Each of said columns contain an adsorbent which is capable of adsorbing the ingredient to be separated.

In the simulated moving bed system shown in FIG. 2, with the first to fifth rotary valves 15, 17–20 being operated to produce the above-described open and closed states, when a supercritical fluid is supplied through the fourth rotary valve 17 into the fluid passage 13b communicating the eighth and first columns 12h and 12a, the associated check valve 14 performs its back flow checking function and the fluid discharged from the eighth column 12h is led through the fluid passage 13c to the third rotary valve 15 and thence said fluid is passed through the circulation pump 16, fourth rotary valve 17, fluid passage 13e and fluid passage 13b and introduced into the first column 12a.

In operation of the simulated moving bed separation system illustrated in FIG. 2, in the initial adsorption step, a stock mixture is contacted with the adsorbent by the fourth to seventh columns 12d–12g and strongly adsorbable substances are adsorbed on the adsorbent while other weakly adsorbable substances are recovered as a raffinate together with the supercritical fluid. Then, in the purification step, the adsorbent having the strongly adsorbable substances adsorbed thereon by the second and third columns 12b and 12c is contacted with part of the extract so that the weakly adsorbable substances remaining on the adsorbent are expelled and the strongly adsorbable substances are concentrated. In the next desorption step, the adsorbent containing the concentrated strongly adsorbable substances is contacted with the supercritical fluid by the first column 12a so that the strongly adsorbable substances are expelled from the adsorbent and taken out of the simulated moving bed as an extract together with the supercritical fluid. In the final eluent recovery step, the adsorbent retaining substantially only the supercritical fluid adsorbed thereon is contacted with part of the raffinate by the eighth column 12h so that part of the supercritical fluid contained in the adsorbent is recovered as a recovery product.

In this simulated moving bed separation system 11, the supercritical fluid supplying position, the stock solution supplying position and the respective draw-out positions are shifted through a distance corresponding to one column in the direction of fluid flow by manipulating the first to fifth rotary valves 15–20 at given time intervals.

Thus, in the second stage, desorption is performed by the second column 12b, purification by the third and fourth unit columns 12c and 12d, adsorption by the fifth to eight unit columns 12e–12h, and eluent recovery by the first column 12a. As these operations are performed successively, the positions of said works are shifted through a distance corresponding one column and the separation of a mixture of the similar ingredients is accomplished continuously and efficiently.

Also, in the simulated moving bed separation system 11, the amount of the fluid drawn out from each column through the fluid passage 13b is fixed, so that there is no need of adjusting the discharge rate of the circulation pump 16 connected to the third rotary valve 15 upon every changeover of said third rotary valve 15.

Further, in this simulated moving bed separation system 11, a check valve is provided between each stock solution or eluent feed line and the fluid outlet of each column, so that even if a pressure loss is caused for the fluid by the adsorbent contained in each column, there is no possibility that the fluid supplied from each feed line to a fluid passage should flow backwardly to the upstream column.

Thus, when using the simulated moving bed separation apparatus, even if an adsorbent with fairly small particle size is contained in each column, there occurs no back flow of the fluid and smooth operation of the apparatus is accomplished, so that improvement of separating efficiency due to use of a fine adsorbent and long-time continuous operation due to no occurrence of back flow of the circulating fluid are realized.

The extract, which is taken out of the above simulated bed contains the object ingredient at a high percentage of not less than 90%. Specifically, in the case of separation of optically active substances, the extract contains the object optical isomer at a percentage of not less than 95% or not less than 98%. The raffinate contains the other optical isomer at the same level of optical purity.

Needless to say, the apparatus is not limited to those shown in FIG. 1 and FIG. 2, but simulated moving bed of various type can be used.

The invention is now specifically illustrated by way of working examples. However, the invention is not limited thereto but can be suitably modified within the scope that does not deviate from the spirit of the invention.

(EXAMPLE 1)

To a simulated moving bed chromatographic apparatus comprising 8 columns of 1 cm in the inner diameter and 250 cm in length packed with cellulose tris-(3,5-dimethylphenyl carbamate) carried on silica gel ("CHIRALCEL OD"®, marketed by Daicel Chemical Industries, Ltd., particle diameter: 20 $\mu$m), which is an adsorbent for optical resolution, trans-stilbene oxide was supplied at a rate of 1.5 ml/min. (the concentration of racemic compound was 10 mg/ml) and the chromatographic separation was carried out under the following conditions. Two columns was allotted to each step.

Supercritical fluid: carbon dioxide/ethanol 3: 0.2(vol) mixture

Rate of feeding of the supercritical fluid: 50 ml/min.

Flow rate at the extract outlet: 35 ml/min.

Flow rate at the raffinate outlet: 16.5 ml/min.

Interval of column shift: 2.5 min.

Temperature of the simulated moving bed: 60° C.

Pressure in the simulated moving bed (back pressure at the outlet): 100 kgf/cm$^2$ (+)—Trans-stilbene oxide having an optical purity of 96%ee was obtained from the extract outlet at the rate of 5.1 mg/min. and (−)—trans-stilbene oxide having an optical purity of 99%ee was obtained from the outlet at a rate of 4.9 mg/min.

(EXAMPLE 2)

To a simulated moving bed chromatographic apparatus comprising 8 columns of 1 cm in the inner diameter and 250 cm in length packed with cellulose tri(p-methylbenzoate) carried on silica gel ("CHIRALCEL OJ"® marketed by Daicel Chemical Industries, Ltd., particle diameter: 20 $\mu$m), which is an adsorbent for optical resolution, alpha-tritylbenzyl alcohol was supplied at a rate of 2.5 ml/min. (the concentration of racemic compound was 12 mg/ml) and the chromatographic separation was carried out under the following conditions.

Supercritical fluid: carbon dioxide/2-propanol 3:0.2 (vol) mixture

Rate of feeding of the supercritical fluid: 50 ml/min.

Flow rate at the extract outlet: 32 ml/min.

Flow rate at the raffinate outlet: 20.5 ml/min.

Interval of column shift: 11 min.

Temperature of the simulated moving bed: 60° C.

Pressure in the simulated moving bed (back pressure at the outlet): 100 kgf/cm$^2$ (+)—$\chi$-Tritylbenzyl alcohol having an optical purity of 90.5%ee was obtained from the extract outlet at the rate of 6.3 mg/min. and (−)—$\chi$-tritylbenzyl alcohol having an optical purity of 99%ee was obtained from the outlet at a rate of 5.7 mg/min.

Advantages of the Invention

According to the present invention, the number of theoretical plates of the columns is enhanced. That is, the present invention provides a simulated moving bed chromatographic separation process which is excellent in separation efficiency and operation efficiency. The concentration of the resulting solution is eliminated since the eluent is automatically removed by vaporization.

Further, if a simulated moving bed separation apparatus with check valves is employed for the process, there takes place no back flow of the circulating fluid toward the upstream columns when a supercritical fluid and a stock solution are supplied to the circulation lines from the respective feed lines, so that a smooth separating operation free of trouble due to occurrence of back flow is realized. Also, since back flow of the circulating fluid is prevented, it becomes possible to use an adsorbent with a small particle diameter which will not induce a large pressure drop in the columns, and by filling the columns with such fine adsorbent, it is possible to attain a phenomenal improvement of separating efficiency.

In addition, if a simulated moving bed separation apparatus with rotary valves-incorporated therein described above is employed for the process, there is no need of adjusting the flow rate of the fluid circulated by the circulation pump, and further since the first to fifth rotary valves are changed over synchronously with each other, the performance of this process is very simplified and it is also possible to efficiently separate a desired component in a mixture.

What is claimed is:

1. A simulated moving bed chromatographic process for separating a mixture of substances, comprising:

forming a circulation circuit comprising a plurality of columns, each provided with an inlet port and an outlet port and packed with a solid adsorbent, said columns being serially and endlessly connected so as to achieve serial and unidirectional fluid flow through said columns at a constant circulation flow rate, and means for pumping a fluid through said columns;

introducing a stock solutions containing a plurality of substances to be separated, into one of the columns via the inlet port thereof in order to make strongly adsorbable substances adsorbed on the adsorbent in the column and several columns that follow;

drawing out a portion of a solution rich in other substances weakly adsorbable on the adsorbent via the outlet port of another one of the columns;

introducing a supercritical fluid as an eluent into still another one of the columns via the inlet port thereof to desorb strongly adsorbable substances from the adsorbent;

passing the remaining solution and the supercritical fluid through the circuit and recirculating them, drawing out a solution rich in the strongly adsorbable substances via the outlet port of further another one of the columns, wherein the position for introducing the supercritical fluid, the position for drawing out the solution containing the strongly adsorbable substances, the position for introducing the stock solution, and the position for drawing out the solution containing the weakly adsorbable substances are arranged in the circulation in this order along the direction of the fluid flow, and the positions are successively moved in the direction of the fluid flow in the circuit by intermittently changing over the position for introducing the supercritical fluid, the position for drawing out the solution containing the strongly adsorbable substances, the position for introducing the stock solution, and the position for drawing out the solution containing the weakly adsorbable substances without changing the order of the positions, wherein, in said changing over step, the circulation flow rate is kept constant without a stepwise increase or decrease in flow as the positions for introducing and for drawing out are successively shifted in the direction of fluid flow.

2. The simulated moving bed chromatography process according to claim 1, wherein the plurality of columns in the circulation circuit are equally divided into four groups of serially linked columns, each group corresponding to one or more columns immediately following each position for introducing or for drawing out.

3. The simulated moving bed chromatography process according to claim 1, wherein unidirectional fluid flow through the plurality of columns is maintained in the circulation circuit and backflow of fluid between adjacent columns in the direction opposite the unidirectional fluid flow is prevented.

4. The simulated moving bed chromatography process according to claim 3, wherein the backflow of fluid between adjacent columns in the direction opposite the unidirectional fluid flow is prevented by means of a check valve.

5. A simulated moving bed chromatographic process according to claim 3, wherein the solid adsorbent is a filler for optical resolution.

6. A simulated moving bed chromatographic process according to claim 3, wherein the solid adsorbent is selected from the group consisting of particles of a cellulose ester derivative, particle of a cellulose carbamate derivative and those substances carried on a support.

7. A simulated moving bed chromatographic process according to claim 3, wherein the mixture of substances to be separated is a mixture of optical isomers, a mixture of diasteromers, or a mixture of structural isomers.

8. A simulated moving bed chromatographic process for separating a mixture of substances, comprising the steps of:

forming a circulation circuit comprising a plurality of columns, each provided with an inlet port and an outlet port and packed with a solid adsorbent, the columns being serially and endlessly connected so as to achieve serial and unidirectional fluid flow through the columns, wherein backflow of fluid between adjacent columns in the direction opposite the unidirectional fluid flow is prevented;

introducing a stock solution, containing a plurality of substances to be separated, into a column via the inlet port thereof in order to adsorb strongly adsorbable substances on the adsorbent in the column immediately following the position where the stock solution is introduced;

drawing out a portion of a solution rich in substances weakly adsorbable on the adsorbent via the outlet port of another column and recirculating the remaining portion of the solution rich in weakly adsorbable substances in the circulation circuit;

introducing a supercritical fluid as an eluent into still another column via the inlet port thereof to desorb strongly adsorbable substances from the adsorbent;

drawing out a solution rich in the strongly adsorbable substances via the outlet port of yet another column, wherein the position for introducing the stock solution, the position for drawing out the solution rich in the weakly adsorbable substances, the position for introducing the supercritical fluid, and the position for drawing out the solution rich in the strongly adsorbable substances are arranged in the circulation in this order along the direction of the fluid flow; and intermittently changing over the position for introducing the stock solution, the position for drawing out the solution rich in the weakly adsorbable substances, the position for introducing the supercritical fluid, and the position for drawing out the solution rich in strongly adsorbable substances by successively shifting each position in the direction of fluid flow in the circulation circuit without changing the order of the positions.

9. A simulated moving bed chromatographic process according to claim 8, wherein the solid adsorbent is a filler for optical resolution.

10. A simulated moving bed chromatographic process according to claim 8, wherein the solid adsorbent is selected from the group consisting of particles of a cellulose ester derivative, particle of a cellulose carbamate derivative and those substances carried on a support.

11. A simulated moving bed chromatographic process according to claim 8, wherein the mixture of substances to be separated is a mixture of optical isomers, a mixture of diasteromers, or a mixture of structural isomers.

12. The simulated moving bed chromatography process according to claim 8, wherein the backflow of fluid between adjacent columns in the direction opposite the unidirectional fluid flow is prevented by means of a check valve.

13. The simulated moving bed chromatography process according to claim 8, wherein the plurality of columns in the circulation circuit are equally divided into four groups of serially linked columns, each group corresponding to one or more columns immediately following each position for introducing or for drawing out.

* * * * *